United States Patent
Ufer et al.

(10) Patent No.: US 6,627,034 B1
(45) Date of Patent: Sep. 30, 2003

(54) PATTERN RELEASE FILM BETWEEN TWO LAMINATED SURFACES

(75) Inventors: Stefan Ufer, Carrboro, NC (US); Jerome J. Cuomo, Cary, NC (US)

(73) Assignee: North Carolina State University, Raleigh, NC (US)

( * ) Notice: Subject to any disclaimer, the term of this patent is extended or adjusted under 35 U.S.C. 154(b) by 190 days.

(21) Appl. No.: 09/625,903

(22) Filed: Jul. 26, 2000

Related U.S. Application Data

(60) Provisional application No. 60/145,889, filed on Jul. 27, 1999.

(51) Int. Cl.[7] ............... B32B 31/12; B32B 31/20
(52) U.S. Cl. ............. 156/289; 156/290; 156/252; 156/257; 156/308.4
(58) Field of Search ............... 156/289, 290, 156/291, 308.4, 252, 257; 264/610

(56) References Cited

U.S. PATENT DOCUMENTS

| | | | |
|---|---|---|---|
| 3,523,050 A | * | 8/1970 | Campbell |
| 3,616,121 A | * | 10/1971 | Freundlich ............... 156/289 X |
| 3,788,922 A | | 1/1974 | Rasmussen ............... 156/244 |
| 3,829,342 A | * | 8/1974 | Prisk |
| 4,087,578 A | * | 5/1978 | Reese et al. |
| 4,288,275 A | * | 9/1981 | Davis |
| 4,426,253 A | | 1/1984 | Kreuz et al. ............... 156/668 |
| 4,490,420 A | * | 12/1984 | Yoshida ............... 156/289 X |
| 4,563,230 A | * | 1/1986 | Nocivelli ............... 156/289 X |
| 4,681,928 A | * | 7/1987 | Berger et al. |
| 4,803,029 A | * | 2/1989 | Iversen et al. |
| 4,814,030 A | * | 3/1989 | Dubuisson et al. ....... 156/290 X |
| 4,857,143 A | | 8/1989 | Glenning et al. ............ 156/668 |
| 5,123,987 A | * | 6/1992 | Mattia ............... 156/289 X |
| 5,183,534 A | | 2/1993 | Fjare et al. ............... 156/668 |
| 5,350,487 A | | 9/1994 | Ameen et al. ............... 156/642 |
| 5,514,431 A | * | 5/1996 | Shimomura |
| 5,525,405 A | | 6/1996 | Coverdell et al. ........... 428/213 |
| 5,674,580 A | * | 10/1997 | Boswell |
| 5,932,799 A | | 8/1999 | Moles ............... 73/53.01 |
| 6,073,482 A | | 6/2000 | Moles ............... 73/53.01 |
| 6,183,578 B1 | * | 2/2001 | Ritter et al. |
| 6,293,012 B1 | | 9/2001 | Moles ............... 29/890.124 |

FOREIGN PATENT DOCUMENTS

| | | | |
|---|---|---|---|
| WO | WO 99/09534 | 3/1998 | ............ A23G/9/00 |
| WO | 00/26957 | * 5/2000 | |

OTHER PUBLICATIONS

International Search Report for PCT/US 00/ 40487, mailed Nov. 14, 2000.

* cited by examiner

*Primary Examiner*—Curtis Mayes
(74) *Attorney, Agent, or Firm*—Myers Bigel Sibley & Sajovec

(57) ABSTRACT

A method of forming a laminate structure comprises providing a first substrate and a second substrate each having first and second substrate surfaces respectively, and wherein the surfaces are present in an opposed spaced apart relationship; contacting at least one of the first or second substrate surfaces with a release material such that a portion of the first or second substrate surface is covered with the release material while the remainder of the first or second substrate surface is not covered with the release material; bringing the first and second substrate surfaces of the first and second substrates into contact with each other; and subjecting the substrates to conditions such that the portions of the first and second substrate surfaces not covered with release material become bonded to one another and a laminate structure is formed. The portion of the first or second substrate surface covered with the release material allows the first and second substrates to separate from each other such that an opening is formed therebetween that is substantially coincident with the portion covered with the release material.

89 Claims, 1 Drawing Sheet

PATTERN RELEASE FILM BETWEEN TWO LAMINATED SURFACES

CROSS-REFERENCE TO RELATED APPLICATIONS

The instant application claims priority to U.S. provisional application Ser. No. 60/145,889 filed Jul. 27, 1999, the disclosure of which is incorporated herein by reference in its entirety.

FIELD AND BACKGROUND OF THE INVENTION

The invention generally relates to methods of forming laminated structures, and structures formed therefrom.

Polymer films typically play an important role in a variety of applications including, but not limited to, electrical and electronic insulation applications. Some of the potential intrinsic advantages of polymers for microelectronics applications include their low cost, relative ease of handling and properties like flexibility, planarizability and stability. Depending on the needs of a particular application, the polymers usually can be modified through chemistry and engineering. Moreover, they can be processed using a variety of methods such as chemical etching, plasma etching, reactive ion etching and laser ablation.

Organic polymer films are often used in the above applications. Examples include polyimides such as KaptonNA® sold by E. I. DuPont de Nemours, Inc. of Wilmington, Del., Mylar® sold by E. I. DuPont de Nemours, Inc., polyesters, plastics, epoxies, polyethylene, polystyrene, and the like. Processing of these films requires that the polymer film can withstand elevated temperatures. For example, polyimide is a widely used insulator since it is stable to approximately 400° C.

U.S. Pat. No. 5,525,405 the disclosure of which is incorporated herein by reference in its entirety describes a polyimide laminate and a process for preparing same, which can be bonded through a lamination step without using an adhesive. This method enables the fabrication of a polyimide laminate having a relatively large thickness of 50 microns or more. A polyimide substrate material of this type is Kapton NA®. Furthermore, aqueous solutions containing sodium hydroxide or potassium hydroxide are believed to be able the wet-etch polyimide-based polymers as described in U.S. Pat. Nos. 5,350,487; 5,183,534; 4,857,143 and 4,426,253, the disclosures of which are incorporated herein by reference in their entirety. In such a way, vias and/or channel-like structures can be incorporated into a polyimide film.

Notwithstanding the above, there remains a need in the art to provide devices, such as micro-mechanical devices for example, which can be used for fluidic control on a flexible substrate. The controlled flow of fluids is of particular interest for, but not limited to, medical industrial applications, micro-mechanical and electronic applications. Therefore, it would be highly advantageous to provide methods of forming laminated structures allowing for fluidic control, along with the laminated structures themselves.

SUMMARY OF THE INVENTION

In one aspect, the invention provides a method of forming a laminate structure. The method comprises providing a first substrate and a second substrate each having first and second substrate surfaces respectively, and wherein the surfaces are present in an opposed spaced apart relationship; contacting at least one of the first or second substrate surfaces with a release material such that a portion of the first or second substrate surface is covered with the release material while the remainder of the first or second substrate surface is not covered with the release material; bringing the first and second substrate surfaces of the first and second substrates into contact with each other; and subjecting the substrates to conditions such that the portions of the first and second substrate surfaces not covered with release material become bonded to one another and a laminate structure is formed. The portion of the first or second substrate surface covered with the release material allows the first and second substrates to separate from each other such that an opening is formed therebetween that is substantially coincident with the portion covered with the release material.

In another aspect, the invention provides a laminate structure. The laminate structure comprises a first substrate having a first surface; a second substrate having an second surface opposed thereto; and a release material present on a portion of the first and second surfaces such that the remainder of the first and second surfaces not covered with release material are bonded to each other. The portion of the first and second surfaces containing release material thereon are capable of separating from each other such that an opening is formed therebetween that is substantially coincident with the portion covered with the release material.

In another aspect, the invention provides an article of manufacture comprising a laminate structure.

These and other aspects and advantages of the invention are set forth in detail herein.

DETAILED DESCRIPTION OF THE PREFERRED EMBODIMENTS

The invention will now be described by the preferred embodiments and drawings hereinbelow. It should be clearly understood that these embodiments are only meant to illustrate the invention, and are not intended to limit the scope of the invention.

Figure 1:
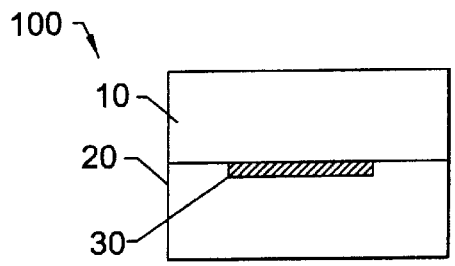
FIGS. 1 through 4 illustrate a method of making a laminated structure in accordance with the invention.

FIGS. 1–4 illustrate a method of forming a laminate structure in accordance with the invention. As depicted in FIG. 1, a first substrate,10 having a first substrate surface 15 and a second substrate 20 having a second substrate surface 25 are provided with the first and second substrate surfaces being in an opposed spaced apart relationship. The substrates may be formed from any number of material, which may be optionally modified through chemistry and/or engineering. Preferably, the substrates comprise organic polymeric materials such as, but not limited to, polyimide, polyesters, plastics, epoxies, polyethylene, polyvinyl chlorides, acrylates, polyurethanes, polycarbonates, and polystyrene. Blends, mixtures, and combinations of the above may be used. Polyimide is a particularly preferred substrate material with KaptonNA® sold by E. I. DuPont de Nemours, Inc. of Wilmington, Del. being a specific commercially-available example. Both the first and second substrates may be formed from the same or different material. The thicknesses of the first and second substrates may be the same or different, and preferably range from about 0.33333 mil ($8.5 \times 10^{-4}$ cm) to about 30 mil ($7.62 \times 10^{-2}$ cm).

Figure 2:
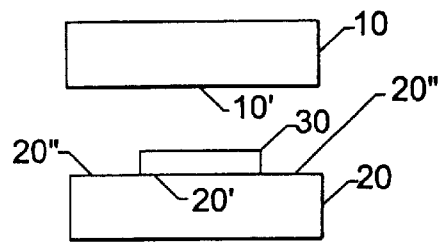

Referring to FIG. 2, a portion 20' of one of the substrates (in this embodiment second substrate surface 25) may be contacted with a release material 30. For the purposes of the invention, the term "release material" refers to material which, after being incorporated into the laminate structure described herein, allows for the detachment or separation of the substrates over the area covered the release material by application of force. In other words, the first and second substrates do not bond to each other in the area covered by the release film. As an example, a release material may be referred to as parting surfaces, anti-bonding, non-bonding, or non-adhering surfaces. Types of suitable release materials include, but are not limited to, inorganic compounds, particularly those formed from aluminum, magnesium, or silicon. Exemplary release materials are $Al_2O_3$, AlN, MgO, TiN, ZrN, HfN, NiO, $SiO_2$, and $Si_3N_4$ and the like. Carbon materials (denoted by C) are also suitable and include, as an example, the family of diamond-like carbons, such as carbon nitrides (e.g., $C_2N$, $CN_{1-x}$ wherein x ranges from 0 to 0.9) and materials of general formula M—O—C—H—N; wherein M is a metal selected from the group consisting of silicon, titanium, tantalum, germanium, boron, zirconium, aluminum, hafnium and yttrium. Compounds and combinations of the above may also be employed. The release material may have various thicknesses. Preferably, the thickness of the release material ranges from about 10 Å to about 10,000 Å, and more preferably from about 10 Å to about 500 Å.

Although not pictured, a portion of the first substrate surface 10' may be covered with the release material 30, or alternatively, portions of both first and second substrate surfaces may be contacted with the release material; 30. In one embodiment, the release material may be present on an isolated region of one of the first or second substrates. As seen in FIG. 2, the remainder of the second substrate surface (denoted by 20") is not covered with release material and the opposing area of the first substrate surface is also not covered with release material.

The release material may be applied using a known technique such as, for example, vacuum deposition such as sputtering, chemical vapor deposition, ion beam deposition, evaporation, or reactive evaporation. Other methods include chemical methods such as, but not limited to, oxidation in a gas or liquid phase, or an electrochemical redox reaction. The release material is preferably deposited in such a manner so as to form a patterned release film on one or both of the two substrates.

Figure 3:
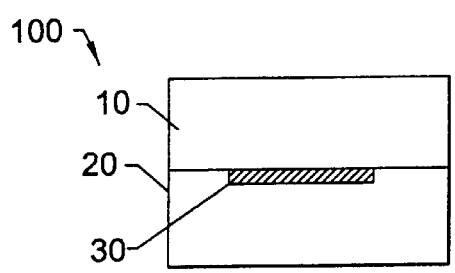

As illustrated in FIG. 3, the first 10 and second 20 substrates are brought together such that the substrates come into contact with each other. The substrates are then subjected to conditions such that the portions of the first and second substrates not covered by release material become bonded to each other and a laminate structure 100 is formed. Typically, the substrates are subjected to suitable thermal and pressure conditions to form the laminate structure. The temperature preferably ranges from about 275° C. to about 455° C., and the pressure applied to the substrates preferably ranges from about 20 bar to about 700 bar, more preferably from about 24 bar to about 690 bar. The substrates can be subjected to a vacuum of less than 1 bar (760 mm Hg). The lamination of the substrates typically takes place from about 5 min to about 3 hr, and may be carried out using equipment known to one who is skilled in the art. Advantageously, the substrates may be laminated together without using any adhesive, although adhesive may be employed if so desired.

Figure 4:
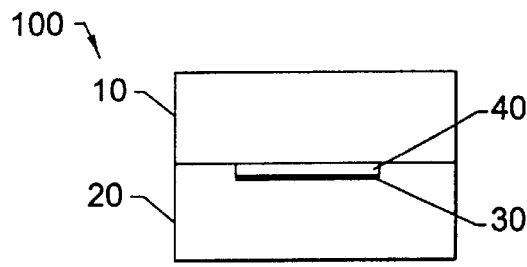

Referring now to FIG. 4, the presence of release material allows for an opening to be formed over portions of the laminated first and second substrate surfaces covered by the release material. The opening 40 may be achieved through the application of force such as a fluid (e.g., gas or liquid) or other means. It should be emphasized that the structure of the laminated structure formed in accordance with the invention provides for the formation of a patterned three-dimensional opening.

Figure 5:
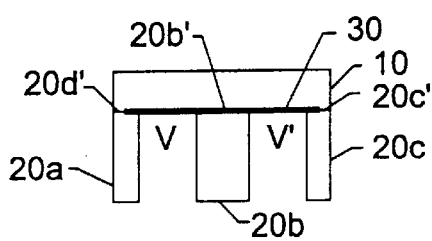
FIG. 5 is an illustration of laminate structure in which one of the two substrate materials contains features such as vias and a patterned release film.
Figure 6:
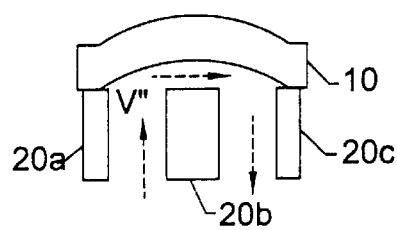
FIG. 6 is an illustration of a structure containing a fluidic valve in the open position. The arrows describe the possible flow of a liquid.

In one application, the release materials can be used in a manner such that a three-dimensional fluidic valve is present in the laminated structure, as described by FIGS. 5 and 6. Referring to FIG. 5, the second substrate is present as a non-unitary structure and is represented by end sections 20a and 20c and middle section 20b. As depicted, release material 30 is present between the substrates covering the surface 20b' of the middle section 20b and a portion of the end sections 20a and 20c. Other portions of the end sections 20a' and 20c' are bonded to the first substrate 10. Open areas (denoted by v and v') are present between respective sides of the end sections facing the middle section.

A fluid such as a liquid or gas may be transported between middle section 20b and end section 20a as illustrated by the arrow denoted in FIG. 6. Advantageously, the presence of the release material 30 between the middle section 20b and the first substrate allows the middle section to serve as a valve and allow the fluid to be transported through via v" created in the laminate structure. In this instance, the middle structure 20b detaches from the first substrate.

Figure 7:
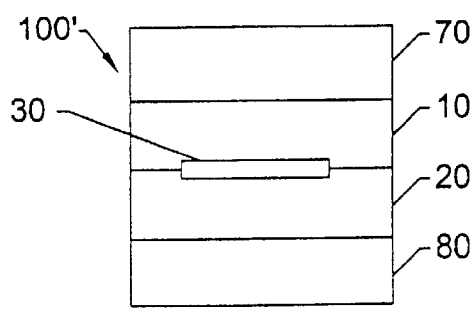
FIG. 7 is an illustration of a laminate structure having multiple substrates present therein.

FIGS. 1–6 depict a laminate structure employing two substrates. It should be emphasized however that additional substrates may also be. employed. As an illustration, FIG. 7 depicts a laminate structure 100' having substrates 70, 10, 20, and 80. Other laminate structures having multiple substrates may be contemplated within the scope of the invention.

The invention is highly advantageous. The presence of the release material in the laminate allows for the incorporation of vias and/or channel like structures into the laminate. In one embodiment, a portion of the first and second structures of the laminate structure which are covered with release material form an interconnected network. The release material allows for a channel to be selectively opened or closed and thus a fluid may be directed through a predetermined, patterned channel or pathway through the laminate.

Advantageously, a number of articles of manufacture may employ the laminated structure illustrated herein. Examples of suitable articles of manufacture include, but are not limited to, devices used in conjunction with microelectronics, micro-mechanical devices, and devices used in medical industrial applications. In particular, contact switches such as those used in computer keyboards may be created utilizing the invention. The use of the valve-like structures described herein could be employed as a nozzle to dispense or eject liquids. In the event that multiple valve-like structures and fluidic channels are combined, a device that is capable of pumping liquids could be created.

The invention has been described in detail with respect to the preferred embodiments as detailed in the specification and drawings. However, it must be emphasized that these embodiments are for illustrative purposes only, and do not limit the invention as defined by the claims.

That which is claimed:

1. A method of forming a laminate structure, said method comprising:
providing a first organic substrate and a second organic substrate each having first and second substrate surfaces respectively, and wherein the surfaces are present in an opposed spaced apart relationship;
contacting at least one of the first or second substrate surfaces with an inorganic release material such that a portion of the first or second substrate surface is covered with the release material while the remainder of the first or second substrate surface is not covered with the release material;
bringing the first and second substrate surfaces of the first and second substrates into contact with each other; and
subjecting the substrates to conditions such that the portions of the first and second substrate surfaces not covered with release material become bonded to one another and a laminate structure is formed;
wherein the portion of the first or second substrate surface covered with the release material allows the first and second substrates to separate from each other such that an opening is formed therebetween that is substantially coincident with the portion covered with the release material, and wherein said release material is formed from a material selected from the group consisting of $Al_2O_3$, AlN, MgO, $SiO_2$, $Si_3N_4$, NiO, TiN, ZrN, HfN, compounds thereof, and combination thereof.

2. The method according to claim 1, wherein at least one of the first or second substrates comprises an organic polymeric material.

3. The method according to claim 2, wherein the organic polymeric material is a polyimide.

4. The method according to claim 1, wherein said contacting step comprises contacting both of the first and second substrate surfaces with the release material.

5. The method according to claim 1, wherein the thickness of the release material ranges from about 10 Å to about 10,000 Å.

6. The method according to claim 1, wherein said contacting step comprises depositing the release material onto the first or second substrate by a technique selected from the group consisting of evaporation, sputtering, chemical vapor deposition, and ion beam deposition.

7. The method according to claim 1, wherein said subjecting step comprises subjecting the first and second substrate to thermal and pressure conditions sufficient to bond said first and second substrates together.

8. The method according to claim 1, wherein neither of the first or second substrates has adhesive material contained thereon.

9. The method according to claim 1, wherein the first and second substrates have the same thicknesses.

10. The method according to claim 1, wherein the first and second substrates have different thicknesses.

11. The method according to claim 1, wherein the laminate structure comprises at least one substrate in addition to the first and second substrates.

12. The method according to claim 1, wherein the release material is formed by an electrochemical redox reaction.

13. The method according to claim 1, wherein the release material is present on an isolated region of one of the first or second substrates.

14. The method according to claim 1, wherein at least one of the first or second substrates is etched such that a via or channel is formed therein.

15. A method of forming a laminate structure, said method comprising:
providing a first substrate and a second substrate each having first and second substrate surfaces respectively, and wherein the surfaces are present in an opposed spaced apart relationship;
contacting at least one of the first or second substrate surfaces with a release material comprising at least one carbon nitride such that a portion of the first or second substrate surface is covered with the release material while the remainder of the first or second substrate surface is not covered with the release material;
bringing the first and second substrate surfaces of the first and second substrates into contact with each other; and
subjecting the substrates to conditions such that the portions of the first and second substrate surfaces not covered with release material become bonded to one another and a laminate structure is formed;
wherein the portion of the first or second substrate surface covered with the release material allows the first and second substrates to separate from each other such that an opening is formed therebetween that is substantially coincident with the portion covered with the release material.

16. The method according to claim 15, wherein at least one of the first or second substrates comprises an organic polymeric material.

17. The method according to claim 16, wherein the organic polymeric material is a polyimide.

18. The method according to claim 15, wherein said contacting step comprises contacting both of the first and second substrate surfaces with the release material.

19. The method according to claim 15, wherein the thickness of the release material ranges from about 10 Å to about 10,000 Å.

20. The method according to claim 15, wherein said contacting step comprises depositing the release material onto the first or second substrate by a technique selected from the group consisting of evaporation, sputtering, chemical vapor deposition, and ion beam deposition.

21. The method according to claim 15, wherein said subjecting step comprises subjecting the first and second substrate to thermal and pressure conditions sufficient to bond said first and second substrates together.

22. The method according to claim 15, wherein neither of the first or second substrates has adhesive material contained thereon.

23. The method according to claim 15, wherein the first and second substrates have the same thicknesses.

24. The method according to claim 15, wherein the first and second substrates have different thicknesses.

25. The method according to claim 15, wherein the laminate structure comprises at least one substrate in addition to the first and second substrates.

26. The method according to claim 15, wherein the release material is formed by an electrochemical redox reaction.

27. The method according to claims 15, wherein the release material is present on an isolated region of one of the first or second substrates.

28. The method according to claim 15, wherein at least one of the first or second substrates is etched such that a via or channel is formed therein.

29. A method of forming a laminate structure, said method comprising:
providing a first substrate and a second substrate each having first and second substrate surfaces respectively, and wherein the surfaces are present in an opposed spaced apart relationship;

contacting at least one of the first or second substrate surfaces with a release material such that a portion of the first or second substrate surface is covered with the release material while the remainder of the first or second substrate surface is not covered with the release material;

bringing the first and second substrate surfaces of the first and second substrates into contact with each other; and subjecting the substrates to conditions such that the portions of the first and second substrate surfaces not covered with release material become bonded to one another and a laminate structure is formed;

wherein the portion of the first or second substrate surface covered with the release material allows the first and second substrates to separate from each other such that an opening is formed therebetween that is substantially coincident with the portion covered with the release material;

wherein said release material is represented by the formula M—O—C—H—N wherein M is a metal selected from the group consisting of silicon, titanium, tantalum, germanium, boron, zirconium, aluminum, hafnium, and yttrium.

30. The method according to claim 29, wherein at least one of the first or second substrates comprises an organic polymeric material.

31. The method according to claim 30, wherein the organic polymeric material is a polyimide.

32. The method according to claim 29, wherein said contacting step comprises contacting both of the first and second substrate surfaces with the release material.

33. The method according to claim 29, wherein the thickness of the release material ranges from about 10 Å to about 10,000 Å.

34. The method according to claim 29, wherein said contacting step comprises depositing the release material onto the first or second substrate by a technique selected from the group consisting of evaporation, sputtering, chemical vapor deposition, and ion beam deposition.

35. The method according to claim 29, wherein said subjecting step comprises subjecting the first and second substrate to thermal and pressure conditions sufficient to bond said first and second substrates together.

36. The method according to claim 29, wherein neither of the first or second substrates has adhesive material contained thereon.

37. The method according to claim 29, wherein the first and second substrates have the same thicknesses.

38. The method according to claim 29, wherein the first and second substrates have different thicknesses.

39. The method according to claim 29, wherein the laminate structure comprises at least one substrate in addition to the first and second substrates.

40. The method according to claim 29, wherein the release material is formed by an electrochemical redox reaction.

41. The method according to claim 29, wherein the release material is present on an isolated region of one of the first or second substrates.

42. The method according to claim 29, wherein at least one of the first or second substrates is etched such that a via or channel is formed therein.

43. A method of forming a laminate structure, said method comprising:

providing a first substrate and a second substrate each having first and second substrate surfaces respectively, and wherein the surfaces are present in an opposed spaced apart relationship;

contacting both of the first and second substrate surfaces with a release material such that a portion of the first or second substrate surface is covered with the release material while the remainder of the first or second substrate surface is not covered with the release material, wherein the thickness of the release material ranges from about 10 Å to about 10,000 Å;

bringing the first and second substrate surfaces of the first and second substrates into contact with each other; and subjecting the substrates to conditions such that the portions of the fist and second substrate surfaces not covered with release material become bonded to one another and a laminate structure is formed;

wherein the portion of the first or second substrate surface covered with the release material allows the first and second substrates to separate from each other such that an opening is formed therebetween that is substantially coincident with the portion covered with the release material.

44. The method according to claim 43, wherein said release material is formed from a material selected from the group consisting of $Al_2O_3$, AlN, MgO, $SiO_2$, $Si_3N_4$, C, NiO, TiN, ZrN, HfN, compounds thereof, and combinations thereof.

45. The method according to claim 43, wherein said release material comprises at least one carbon nitride.

46. The method according to claim 43, wherein said release material is represented by the formula M—O—C—H—N wherein M is a metal selected from the group consisting of silicon, titanium, tantalum, germanium, boron, zirconium, aluminum, hafnium, and yttrium.

47. The method according to claim 43, wherein at least one of the first or second substrates comprises an organic polymeric material.

48. The method according to claim 47, wherein the organic polymeric material is a polyimide.

49. The method according to claim 43, wherein said contacting step comprises depositing the release material onto the first or second substrate by a technique selected from the group consisting of evaporation, sputtering, chemical vapor deposition, and ion beam deposition.

50. The method according to claim 43, wherein said subjecting step comprises subjecting the first and second substrate to thermal and pressure conditions sufficient to bond said first and second substrates together.

51. The method according to claim 43, wherein neither of the first or second substrates has adhesive material contained thereon.

52. The method according to claim 43, wherein the first and second substrates have the same thicknesses.

53. The method according to claim 43, wherein the first and second substrates have different thicknesses.

54. The method according to claim 43, wherein the laminate structure comprises at least one substrate in addition to the first and second substrates.

55. The method according to claim 43, wherein the release material is formed by an electrochemical redox reaction.

56. The method according to claim 43, wherein the release material is present on an isolated region of one of the first or second substrates.

57. The method according to claim 43, wherein at least one of the first or second substrates is etched such that a via or channel is formed therein.

58. A method of forming a laminate structure, said method comprising:

providing a first substrate and a second substrate each having first and second substrate surfaces respectively, and wherein the surfaces are present in an opposed spaced apart relationship;

contacting at least one of the first or second substrate surfaces with a release material by depositing the release material onto the first or second substrate by a technique selected from the group consisting of evaporation, sputtering, chemical vapor deposition, and ion beam deposition, such that a portion of the first or second substrate surface is covered with the release material while the remainder of the first or second substrate surface is not covered with the release material;

bringing the first and second substrate surfaces of the first and second substrates into contact with each other; and subjecting the substrates to conditions such that the portions of the first and second substrate surfaces not covered with release material become bonded to one another and a laminate structure is formed;

wherein the portion of the first or second substrate surface covered with the release material allows the first and second substrates to separate from each other such that an opening is formed therebetween that is substantially coincident with the portion covered with the release material.

59. The method according to claim 58, wherein said release material is formed from a material selected from the group consisting of $Al_2O_3$, AlN, MgO, $SiO_2$, $Si_3N_4$, C, NiO, TiN, ZrN, HfN, compounds thereof, and combinations thereof.

60. The method according to claim 58, wherein said release material comprises at least one carbon nitride.

61. The method according to claim 58, wherein said release material is represented by the formula M—O—C—H—N wherein M is a metal selected from the group consisting of silicon, titanium, tantalum, germanium, boron, zirconium, aluminum, hafnium, and yttrium.

62. The method according to claim 58, wherein at least one of the first or second substrates comprises an organic polymeric material.

63. The method according to claim 62, wherein the organic polymeric material is a polyimide.

64. The method according to claim 58, wherein said contacting step comprises contacting both of the first and second substrate surfaces with the release material.

65. The method according to claim 58, wherein the thickness of the release material ranges from about 10 Å to about 10,000 Å.

66. The method according to claim 58, wherein said subjecting step comprises subjecting the first and second substrate to thermal and pressure conditions sufficient to bond said first and second substrates together.

67. The method according to claim 58, wherein neither of the first or second substrates has adhesive material contained thereon.

68. The method according to claim 58, wherein the first and second substrates have the same thicknesses.

69. The method according to claim 58, wherein the first and second substrates have different thicknesses.

70. The method according to claim 58, wherein the laminate structure comprises at least one substrate in addition to the first and second substrates.

71. The method according to claim 58, wherein the release material is formed by an electrochemical redox reaction.

72. The method according to claim 58, wherein the release material is present on an isolated region of one of the first or second substrates.

73. The method according to claim 58, wherein at least one of the first or second substrates is etched such that a via or channel is formed therein.

74. A method of forming a laminate structure, said method comprising:

providing a first substrate and a second substrate each having first and second substrate surfaces respectively, and wherein the surfaces are present in an opposed spaced apart relationship;

contacting at least one of the first or second substrate surfaces with a release material such that a portion of the first or second substrate surface is covered with the release material while the remainder of the first or second substrate surface is not covered with the release material; wherein the release material is formed by an electrochemical redox reaction;

bringing the first and second substrate surfaces of the first and second substrates into contact with each other; and subjecting the substrates to conditions such that the portions of the first and second substrate surfaces not covered with release material become bonded to one another and a laminate structure is formed;

wherein the portion of the first or second substrate surface covered with the release material allows the first and second substrates to separate from each other such that an opening is formed therebetween that is substantially coincident with the portion covered with the release material.

75. The method according to claim 74, wherein said release material is formed from a material selected from the group consisting of $Al_2O_3$, AlN, MgO, $SiO_2$, $Si_3N_4$, C, NiO, TiN, ZrN, HfN, compounds thereof, and combinations thereof.

76. The method according to claim 74, wherein said release material comprises at least one carbon nitride.

77. The method according to claim 74, wherein said release material is represented by the formula M—O—C—H—N wherein M is a metal selected from the group consisting of silicon, titanium, tantalum, germanium, boron, zirconium, aluminum, hafnium, and yttrium.

78. The method according to claim 74, wherein at least one of the first or second substrates comprises an organic polymeric material.

79. The method according to claim 78, wherein the organic polymeric material is a polyimide.

80. The method according to claim 74, wherein said contacting step comprises contacting both of the first and second substrate surfaces with the release material.

81. The method according to claim 74, wherein the thickness of the release material ranges from about 10 Å to about 10,000 Å.

82. The method according to claim 74, wherein said contacting step comprises depositing the release material onto the first or second substrate by a technique selected from the group consisting of evaporation, sputtering, chemical vapor deposition, and ion beam deposition.

83. The method according to claim 74, wherein said subjecting step comprises subjecting the first and second substrate to thermal and pressure conditions sufficient to bond said first and second substrates together.

84. The method according to claim 74, wherein neither of the first or second substrates has adhesive material contained thereon.

85. The method according to claim 74, wherein the first and second substrates have the same thicknesses.

86. The method according to claim 74, wherein the first and second substrates have different thicknesses.

87. The method according to claim 74, wherein the laminate structure comprises at least one substrate in addition to the first and second substrates.

88. The method according to claim 74, wherein the release m present on an isolated region of one of the first or second substrates.

89. The method according to claim 74, wherein at least one of the first or second substrates is etched such that a via or channel it formed therein.

* * * * *

UNITED STATES PATENT AND TRADEMARK OFFICE
CERTIFICATE OF CORRECTION

PATENT NO. : 6,627,034 B1  Page 1 of 1
DATED : September 30, 2003
INVENTOR(S) : Ufer et al.

It is certified that error appears in the above-identified patent and that said Letters Patent is hereby corrected as shown below:

Column 10,
Line 62, should read -- material is present on an isolated region of one of the first or second --

Signed and Sealed this

Twenty-seventh Day of April, 2004

JON W. DUDAS
*Acting Director of the United States Patent and Trademark Office*